United States Patent [19]

Austin

[11] 3,747,053

[45] July 17, 1973

[54] NOISE REJECTION CIRCUIT

[75] Inventor: Garland R. Austin, Tulsa, Okla.

[73] Assignee: Lowrance Electronics Mfg. Corp., Tulsa, Okla.

[22] Filed: Aug. 20, 1971

[21] Appl. No.: 173,479

[52] U.S. Cl. .................. 340/3 R, 328/111, 340/5 R

[51] Int. Cl. .................. G01s 9/66

[58] Field of Search .................. 340/1 R, 3 R, 5 R; 343/17.1 R; 328/111

[56] References Cited

UNITED STATES PATENTS 3,562,703 2/1971 Grada .................. 340/3 R

*Primary Examiner*—Richard A. Farley

*Attorney*—James R. Head, Paul H. Johnson et al.

[57] ABSTRACT

This invention is concerned with a rejection circuit for discriminating between short radio frequency pulses of different lengths. The circuit operates to delay the leading edges of the pulses by an adjustable time, which is set to be greater than the time duration of the short noise pulses, which are to be rejected, but shorter than the longer signal pulses which are to be passed.

The radio frequency pulses are detected and converted to square pulses. These pulses control a switching means that is conducting at all times, except when the pulse occurs. When the switch becomes non-conducting, a capacitor connected across the switch begins to charge. This voltage controls a Schmitt trigger circuit, such that when the voltage reaches a selected threshold value, the Schmitt trigger starts putting out a square pulse. This pulse ends when the detected pulse ends, and the switch starts to conduct, and the capacitor voltage rapidly drops to a low value. By the use of an adjustable resistance, the charging of the capacitor can be slowed down to the point where its voltage never reaches the threshold value in the short time duration of the noise pulses.

7 Claims, 4 Drawing Figures

NOISE REJECTION CIRCUIT

BACKGROUND OF THE INVENTION

1. Field of the Invention

This invention is in the field of sonar locator devices. More particularly, it is concerned with the design of noise rejection circuits, where the noise pulses are of shorter time duration than the signal pulses.

2. The prior art

The prior art shows various forms of pulse discrimination circuits which act to reject certain pulses and pass others on the basis of pulse length. However, these prior art circuits are complicated and expensive, which is a distinct disadvantage in the areas of application of this invention, namely in the manufacture of simple, inexpensive sonar locator devices.

SUMMARY OF THE INVENTION

These disadvantages of the prior art devices are overcome in the present invention by providing a very much simplified circuit. The delay means comprises a capacitance charged through an adjustable resistance. The charging is initiated by the start of the detected square pulse, which opens a switch across the capacitor, which permits it to start charging. A modified square pulse is generated by a Schmitt trigger, which senses the capacitor voltage, and which starts its output pulse when the capacitor voltage reaches an adjustable threshold. By making the threshold voltage high enough, and the rate of rise of capacitor voltage slow enough, the short noise pulses are over before the threshold voltage is reached, so the Schmitt trigger doesn't operate and these pulses are rejected. With the longer signal pulses, the trigger operates to put out square pulses of shorter duration than the detected pulses.

It is therefore an important object of this invention to provide a means for discriminating against short electrical pulses on the basis of their length, by rejecting all those of shorter time duration than a selected value.

These and other objectives and an understanding of the basic principles of this invention will be apparent from the following description, taken in conjunction with the appended drawings, in which:

DESCRIPTION OF THE PREFERRED EMBODIMENT

Figure 1:
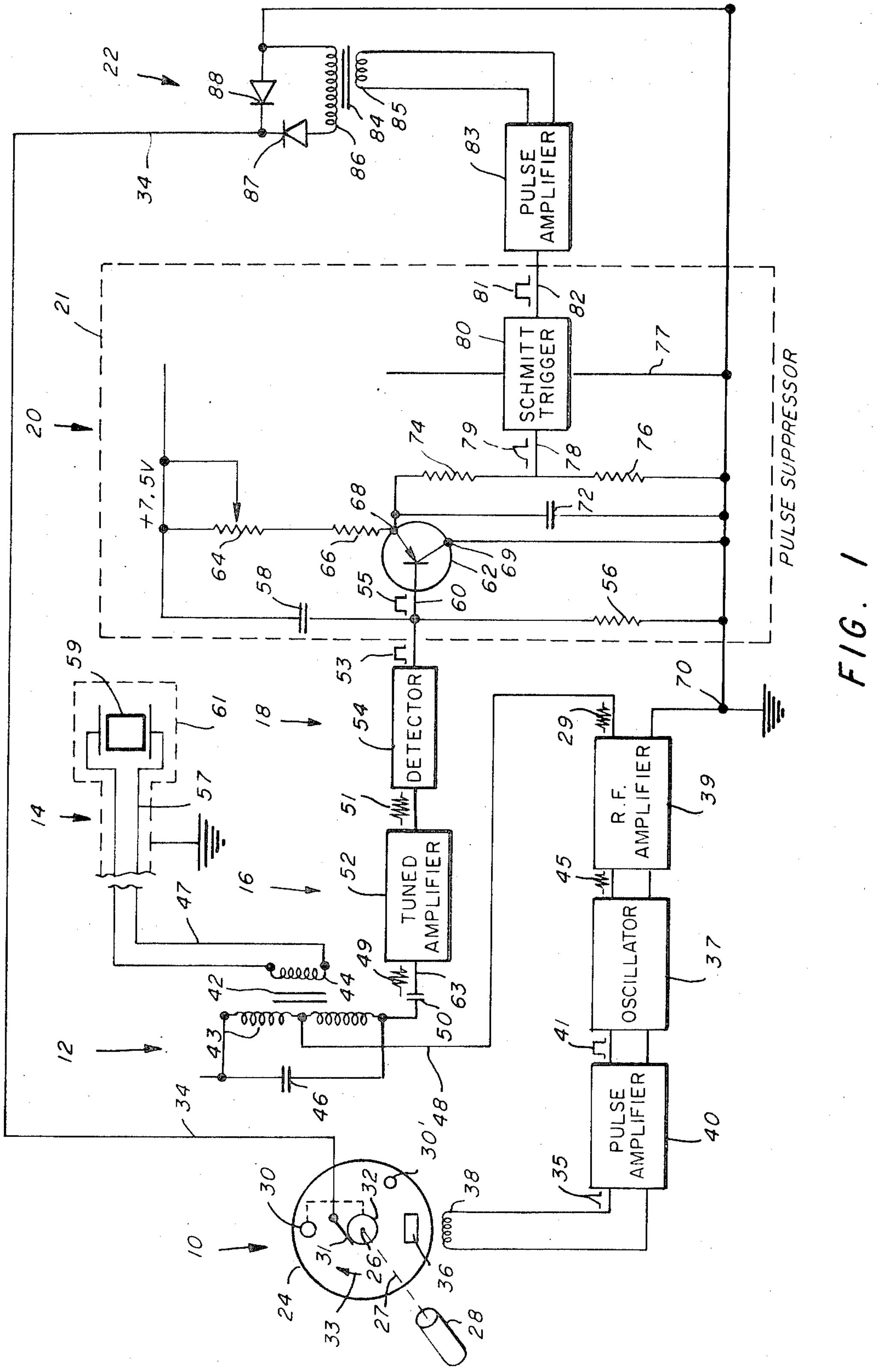
FIG. 1 represents, partly in schematic form, one embodiment of this invention.

In FIG. 1 is a schematic diagram of the sonar locator apparatus of this invention. It comprises a pulse input and display section indicated generally by the numeral 10; a pulse amplification, oscillator, radio frequency amplifier and output section indicated by the numeral 12; a sinar transducer section 14; a received signal input section 16; detector section 18; noise suppressor section 20; and a pulse output section 22.

The pulse input and display section 10 comprises a disk 24 rotatable about shaft 26 by means of motor 28 through drive means 27. Mounted on the disk on one end of a diameter is a neon lamp 30, and at the second end of the diameter is a magnet 36. Adjacent the magnet, but mounted to the frame is a coil 38. As the magnet 36 moves past the coil 38 it generates a pulse of voltage of pulse shape 35, which goes to pulse amplifier 40. The pulse amplifier serves to form a square pulse 41 which goes to oscillator 37 and modulates the oscillator in the form of the short radio-frequency pulse 45. The frequency of the oscillator can, for example, be in the range of about 192 KHz.

The radio frequency pulse 45 is amplified in amplifier 39, the output pulse 29, of which goes to output transformer 42, the primary of which is tuned by capacitor 46 to the frequency of the pulse, 192 KHz.

The secondary 44 of the output transformer goes by leads 47 to the sonar transducer comprised of the piezo-electric means 59, as is well known in the art. The leads 57 are shielded at 61, the shield being grounded. This shielding can, of course, be extended (not shown) to the leads 47, transformer 42 etc. as is well known in the art, to minimize electrical noise pickup into the detecting circuits 16, now to be described.

The pulse 29 going to the transformer 42 causes a corresponding pulse of voltage to be applied to the transducer 59, which, if suspended in water, will cause an elastic (sonic) wave to be generated in the water. This wave will travel outwardly from the transducer, and when it reaches an appropriate surface, part of the energy will be reflected backwardly. Some of this reflected sonic energy will reach the transducer 59 and will generate a weak signal which will travel by leads 47 to transformer 42, and will appear on lead 63 as pulse 49. This goes to tuned amplifier 52 which puts out the amplified pulse 51. This radio frequency signal is detected in detector 54 which puts out the square wave pulse 53.

One of the major problems in the operation of equipment of this type is the problem of detecting weak signals in the presence of noise pickup. Some of the noise comes in through the transducer, as flow noise, etc. Part of the noise comes in through pickup from other electrical accessories in the vicinity, etc. While it might be thought that the noise could be discriminated against on the basis of frequency, this is not possible. In reasearch of this subject it has been determined that the noise is composed of short pulses. So, by making the transmitted sonic signal of longer duration than the noise pulses, it is possible to discriminate between the noise and signal on the basis of the short noise pulses and the longer signal pulses.

This discrimination is done in the noise suppressor part of the circuit enclosed in the dashed block 21. The discrimination is accomplished by delaying the front of all pulses for a time at least as long as the time duration of the noise pulses. If the noise is shorter duration than this delay time, they are eliminated and only the longer signal pulses get through, even though they are shortened in the process.

The pulse 53 output of the detector goes to the load resistance 56. The voltage across this resistance appears as the same pulse 55 on leads 60 to the base of transistor 62. The emitter 68 of the transistor is fed from +7.5V through resistances 64, 66, the first of which is variable. The collecotr 69 goes to ground, and the emitter goes to ground through capacitor 72. When there is no pulse 55 and no voltage on 56, the base lead drops to ground potential, causing transistor 62 to conduct and the capacitor 72 to discharge rapidly through the transistor. When a pulse 53 appears, the potential on the lead 60 and the base of the transistor rises cutting off the current flow. Thus the transistor 62 acts like a quick acting switch that is closed at all times, passing current through resistors 64, 66 and from capacitor 72, except when a pulse 53 appears. When the pulse appears, the switch opens, and the current through resistors 64, 66 now goes into capacitor 72, charging it at an exponential rate determined by the values of 64, 66, 72. The rate of rise of voltage across capacitor 72 can be adjusted by resistor 64. A potential divider composed of resistors 74, 76 delivers a signal pulse 79 via lead 78 to the Schmitt trigger 80. This is a well known circuit device that is available on the market, and needs no detailed description, other than to say that it takes the pulse 79, which has a rounded rise portion, and makes a square pulse 81 of narrower width. This can be explained in connection with FIG. 2.

Figure 2:
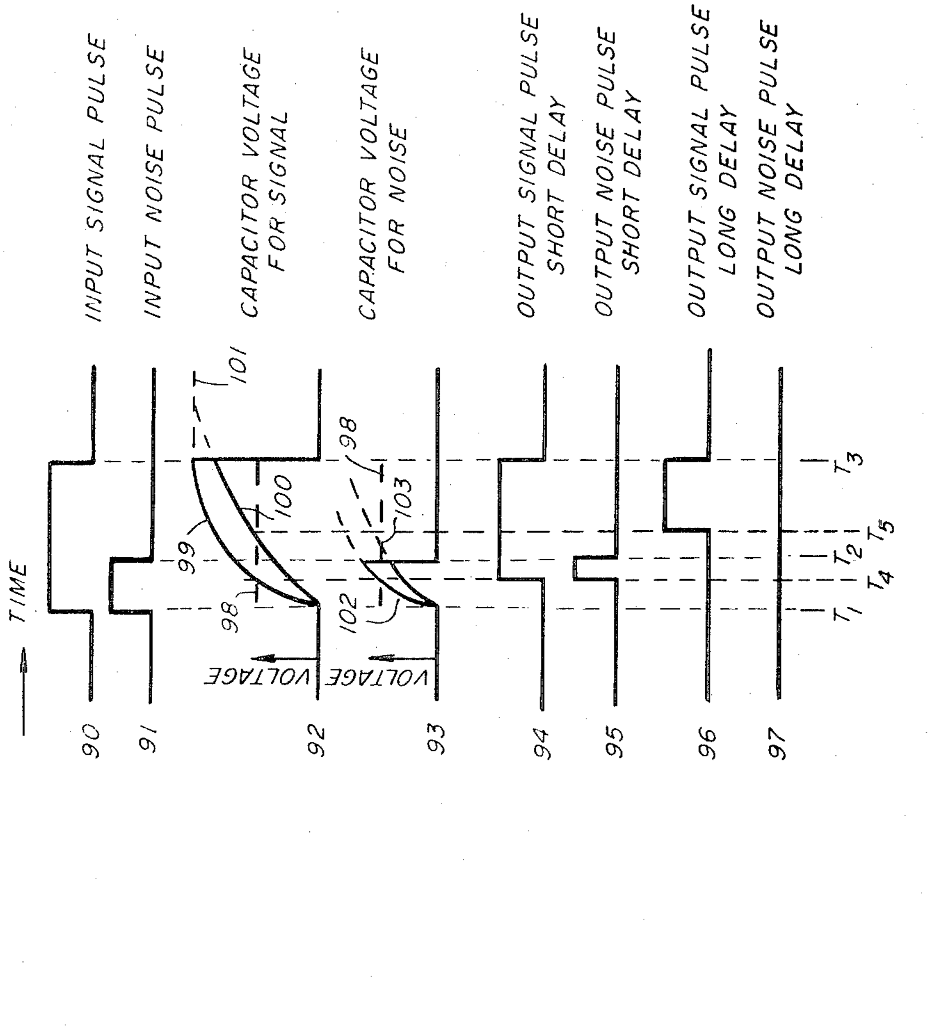
FIG. 2 illustrates how the rejection of short pulses is accomplished.

In FIG. 2 numerals 90, 91 represent two pulses 55. The first is a signal pulse of time duration of T3-T1. The second is a noise pulse of shorter duration T2–T1.

Curve 92 represents the rate of rise of voltage across capacitor 72. The portion 99 represents a faster rate of rise than does 100. These curves 99, 100 start rising at time T1 and are cut off at the end of pulse 90 at T3. The pulse out of the Schmitt trigger is square and rises at a time T4, for example, determined by a threshold voltage 98. When the voltage of pulse 79 (represented by curve 99, for example) reaches threshold voltage 98, the trigger fires and the output pulse 94 starts at time T4. If the slower rising voltage 100 were operative, the rise of the output pulse would be delayed until T5, curve 96. In both cases, the output pulse of the trigger ends at time T3 of the original pulse.

Consider the shorter noise pulse 91. As in curve 93, for the short delay condition the noise pulse 102 rises to threshold potential at T4, so the output pulse is shown at 95. For the long delay condition 103 the noise pulse doesn't reach threshold until T5, which is later than T2, the end of the pulse. Since the noise pulse is over before the threshold of the Schmitt trigger is reached, the noise pulse is completely squelched as shown by 97. Thus, it is seen, that so long as the signal pulse is longer than the noise pulse, a rate of rise of potential of capacitor 72 can be chosen by varying resistor 64 so that the noise pulse is completely suppressed.

Figure 3:
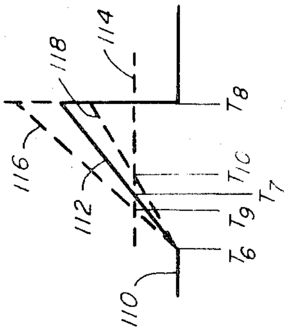
FIGS. 3 and 4 illustrate how the transmitted sonic pulse is adjusted in length.

If the noise pulses are comparable in length of the signal pulses, then it becomes necessary to lengthen the signal pulses. This can be done by using a Schmitt trigger in the amplifier 40. This takes an input pulse 35 that resembles a sawtooth pulse and converts it to a square pulse 41. In FIG. 3 is shown how the input pulse 110, starting at T6, with rate of rise 112 and ending at T8 crosses the threshold potential at time T7. By using a potentiator (or similar means) to vary the rate of rise of the sawtooth, a higher rate of rise 116 will trigger the Schmitt at an earlier time T9 and lengthen the pulse. Conversely, if the rate of rise is slower, th Schmitt will trigger later at time T10, providing a shorter pulse.

Figure 4:
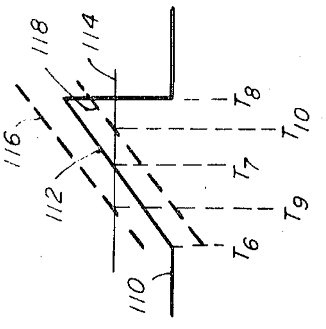

In FIG. 4 is shown a similar case where the pulse is biased with a variable D.C. voltage so that the slope of the rise is the same but it is just shifted up or down. In this case, as in FIG. 3, the time of crossing of the threshold can be varied to control the length of the pulse.

Returning consideration once again to FIG. 1, the output narrowed signal pulses 80 go via lead 82 to pulse amplifier 83 to pulse step-up transformer 84 primary 85. The high voltage on the secondary 86 is carried by lead 34 to the slip ring 32 and neon lamp 30. The square wave output of the Schmitt trigger makes for a sharper, higher-voltage pulse than would a pulse with rounded leading edge. The diodes 87, 88 prevent a negative pulse from the transformer reaching the neon lamp.

In operation, as the disk turns, the magnet generates a rising pulse which is amplified, modulates oscillator 37 and is amplified as an R.F. signal, and applied through transformer 42 to the transducer 59. At the same time, the signal in the transformer 42 goes via lead 63 through the remainder of the circuit ending up with a high voltage pulse on lead 34 which momentarily flashes the lamp 30 in the "12 o'clock" position. As the disk rotates in the direction of arrow 33, the lamp 30 will be in some position such as 30' when the reflected sonar signal returns to the transducer and the transduced signal finally reaches transformer 84. Thus, the angular position of 30' compared to 30 is a measure of the time interval between the outgoing sonar pulse and the return sonar pulse. Because of the relatively constant velocity of elastic waves in water, this time delay is equivalent to distance to the reflecting surface. Thus the angle between 30 and 30' can be calibrated in distance, which can easily be read by the flashing of the lamp 30.

While a number of aspects of this system are old in the art, the important aspect of this invention lies in the pulse suppressor circuit 21 and in the pulse stretching circuit in the pulse amplifier 40.

While this invention has been described with some particularity, it will be clear that from the principles which have been described, one skilled in the art will be able to devise many other embodiments, all of which are considered to be part of this invention which is not to be limited to the abstract, the description or the drawings, but is to have the scope of the appended claim or claims, when construed to the full equivalents of each element.

What is claimed:

1. In a pulse-width discrimination circuit in which radio-frequency signal pulses of time duration T1 are received at a signal receiving means, and in which radio-frequency noise pulses of time duration T2, are also received, where T1 is greater that T2, and where said noise pulses are discriminated against by pulse-width discrimination means in which the starting times of said pulses are delayed by selected time increments, the improvemnet, comprising:

a. detector means for converting said radio frequency signal and noise pulses into positive, square pulses of time duration T1 and T2 respectively;

b. first switch means connected directly to s,id detector means and responsive to said square pulses, and adapted to be conducting at all times between first and second terminals, except when said positive square-pulses are present;

c. capacitor means connected between said first and second terminals, said first terminal connected to ground and said second terminal connected by a first resistance to a positive voltage, said capacitance adapted to be charged at a selected rate from said voltage through said first resistance while said first switch is not conducting, and to be discharged rapidly through said first switch when said first switch is conducting;

d. Schmitt trigger means, the input thereof responsive to the potential of said capacitance; and e. means to vary said first resistance; Whereby the selected rate of charging of said capacitance is varied.

2. The apparatus as in claim 1 in which said Schmitt trigger, in response to the rising potential of said capacitance during charging while said positive square pulse is present, and responsive to its own threshold potential, produces a square pulse output of shorter time duration than said positive square pulse, and including means responsive to said output square pulse to provide a visual indication of the time of occurrence of said output square pulse.

3. The apparatus as in claim 2 including transducer means adapted to receive a sonic radio frequency signal and to produce a corresponding electrical radio frequency signal and first amplifier meas for amplifying said radio frequency signal, said detector means connected to said first amplifier means.

4. The apparatus as in claim 3 including electrical second radio frequency pulse generating means, and means to apply aid second pulses to said transducer means.

5. The apparatus as in claim 4 including means to adjust the time duration of said second generated electrical radio frequency pulses.

6. The apparatus as in claim 5 including rotating means to initiate said pulse generating means and to display said visual indication.

7. A sonar locator apparatus comprising:

a. electrical means to generate repetitive first electrical radio frequency signals of time duration T1, b. transducer means connected to said electrical generating means to produce, in a body of water, sonic radio frequency signals, and to receive and transduce portions of said sonic signals returned from objects in said water, back into second electrical radio frequency signals of time duration T1, and noise radio frequency signals of time duration T2, where T1 is greater than T2, c. detector means for converting said second radio frequency signals and said noise signals into positive square pulses of time duration T1 and T2 respectively, d. first switch means connected directly to said detector means and responsive to said square pulses, and adapted to be conducting at all times between first and second terminals except when said positive sqaure pulses are present;

e. capacitor means connected between said first and second terminals, said first terminal connected to ground and said second terminal connected by a first resistance to a positive voltage, said capacitor adapted to be charged at a selected rate from said voltage through said first resistance while said first switch is not conducting, and to be discharged rapidly through said first switch when said first switch is conducting;

f. Schmitt trigger means, the input thereof responsive to the potential of said capacitor; and g. means to vary said first resistance, whereby the rate of charging of said capacitor is varied.

* * * * *